United States Patent
Chiu

(10) Patent No.: US 10,609,215 B2
(45) Date of Patent: Mar. 31, 2020

(54) TEXT MESSAGE TRANSMISSION APPARATUS AND METHOD THEREOF

(71) Applicants: ASKEY COMPUTER CORP., New Taipei (TW); ASKEY TECHNOLOGY (JIANGSU) LTD., Jiangsu Province (CN)

(72) Inventor: Tai-Kuang Chiu, Taoyuan (TW)

(73) Assignees: ASKEY COMPUTER CORP., New Taipei (TW); ASKEY TECHNOLOGY (JIANGSU) LTD., Jiangsu Province (CN)

(*) Notice: Subject to any disclaimer, the term of this patent is extended or adjusted under 35 U.S.C. 154(b) by 0 days.

(21) Appl. No.: 16/124,196

(22) Filed: Sep. 7, 2018

(65) Prior Publication Data
US 2019/0297187 A1    Sep. 26, 2019

(30) Foreign Application Priority Data
Mar. 26, 2018    (TW) .............................. 107110367 A

(51) Int. Cl.
| | |
|---|---|
| *H04M 3/42* | (2006.01) |
| *G10L 13/00* | (2006.01) |
| *H04M 3/02* | (2006.01) |
| *H04W 4/12* | (2009.01) |
| *H04M 3/00* | (2006.01) |

(52) U.S. Cl.
CPC ......... *H04M 3/42382* (2013.01); *G10L 13/00* (2013.01); *H04M 3/005* (2013.01);
(Continued)

(58) Field of Classification Search
CPC ..... H04L 51/36; H04L 61/1547; H04L 69/16; H04L 69/163; H04L 12/66; H04L 12/2801; H04L 47/14; H04L 49/15; H04L 51/38; H04L 51/066; H04L 12/189; H04L 12/2854; H04L 12/2856; H04L 1/1812; H04W 4/14; H04W 84/14; H04W 80/04; H04W 92/02; H04W 4/12; H04M 7/006; H04M 1/72552; H04M 1/72561; H04M 3/4938; H04M 3/5322; H04M 3/53333;
(Continued)

(56) References Cited
U.S. PATENT DOCUMENTS

| | | | | |
|---|---|---|---|---|
| 5,604,791 A | * | 2/1997 | Lee .................... | H04M 1/658 |
| | | | | 379/142.06 |
| 6,035,273 A | * | 3/2000 | Spies .................. | G10L 15/07 |
| | | | | 704/235 |

(Continued)

*Primary Examiner* — Nimesh Patel
(74) *Attorney, Agent, or Firm* — JCIPRNET

(57) ABSTRACT

A text message transmission apparatus and a method thereof are provided. The text message transmission apparatus includes a mobile network communication module, a subscriber line interface circuit (SLIC) module and a processor. The mobile network communication module receives a text message. The SLIC module is configured to connect to a traditional telephone set in a public switched telephone network (PSTN). The processor is coupled to the mobile network communication module and the SLIC module. The processor decodes the text message to obtain a text content of the text message, transforms the text content into a speech content, and plays back the speech content through the SLIC module. Accordingly, the text messages can be transmitted through the PSTN.

8 Claims, 4 Drawing Sheets

(52) U.S. Cl.
CPC ............... *H04M 3/02* (2013.01); *H04W 4/12* (2013.01); *H04M 3/42187* (2013.01); *H04M 2201/39* (2013.01); *H04M 2201/60* (2013.01)

(58) Field of Classification Search
CPC .. H04M 7/0048; H04M 11/06; H04M 1/2535; H04M 2207/18; H04M 2203/1091; H04M 1/72502; H04M 2250/06; H04M 7/0057; H04M 15/55; H04M 2207/20; H04M 7/063; H04M 15/56; H04M 2207/206; H04M 2215/2026; H04M 2215/2046; H04M 3/42382; H04M 3/005; H04M 3/02; H04M 2201/39; H04M 3/42187; H04M 2201/60; H04N 21/6118; H04N 21/6168; H04N 7/147; H04N 1/00281; G10L 13/00
See application file for complete search history.

(56) References Cited

U.S. PATENT DOCUMENTS

| | | | | |
|---|---|---|---|---|
| 2002/0160757 | A1* | 10/2002 | Shavit | H04M 3/42382 455/414.1 |
| 2003/0095643 | A1* | 5/2003 | Fortman | H04L 51/066 379/88.14 |
| 2003/0120489 | A1* | 6/2003 | Krasnansky | G10L 19/0018 704/235 |
| 2003/0137973 | A1* | 7/2003 | Kim | H04L 12/2856 370/352 |
| 2003/0194077 | A1* | 10/2003 | Ramey | H04M 3/4228 379/221.01 |
| 2004/0132500 | A1* | 7/2004 | Rogalski | H04M 1/72502 455/569.1 |
| 2005/0025296 | A1* | 2/2005 | Benco | H04M 1/72519 379/88.22 |
| 2006/0033809 | A1* | 2/2006 | Farley | H04M 3/428 348/14.01 |
| 2007/0049255 | A1* | 3/2007 | Bhakta | H04W 88/02 455/412.2 |
| 2008/0263348 | A1* | 10/2008 | Zaltsman | G06F 8/63 713/2 |
| 2009/0131090 | A1* | 5/2009 | Jo | H04L 51/066 455/466 |
| 2012/0088481 | A1* | 4/2012 | Postma | G06F 1/1616 455/417 |
| 2015/0365809 | A1* | 12/2015 | Lemberg | H04W 4/90 455/404.1 |
| 2017/0164175 | A1* | 6/2017 | Bozik | H04W 4/90 |

* cited by examiner

TEXT MESSAGE TRANSMISSION APPARATUS AND METHOD THEREOF

CROSS-REFERENCE TO RELATED APPLICATION

This application claims the priority benefit of Taiwan application serial no. 107110367, filed on Mar. 26, 2018. The entirety of the above-mentioned patent application is hereby incorporated by reference herein and made a part of this specification.

BACKGROUND OF THE INVENTION

1. Field of the Invention

The invention relates to a text message transmission, and more particularly, to a text message transmission apparatus and a method thereof.

2. Description of Related Art

In recent years, global climate anomalies have caused a dramatic increase in the frequency of natural disasters. Moreover, volcanic eruptions, tsunami and earthquakes are also disasters likely to affect severe casualties. If an alarm message regarding the disasters can be broadcasted to people in the relevant area as early as possible or in advance, it will be able to avoid or reduce the damage to personnel, or damage to goods, buildings and assets. With the rapid popularization of mobile broadband technology, many countries have been promoting the provision of disaster prevention alerts and related contingency information through mobile networks. In other words, it is still very much required to have a cell phone capable of receiving a text message (e.g., Short Message Service (SMS), Cell Broadcast Service (CBS)) so the cell phone users can receive the alarm message. Consequently, this service cannot deliver the alarm message to people who communicate only by traditional telephone set.

SUMMARY OF THE INVENTION

In light of the above, the invention provides a text message transmission apparatus and a method thereof, which allows a traditional public switch telephone network (PSTN) telephone set can accept the text message from cellular network.

The text message transmission apparatus of the invention includes a mobile network communication module, a subscriber line interface circuit (SLIC) module and a processor. The mobile network communication module receives a text message. The SLIC module is configured to connect to the traditional telephone set on the PSTN. The processor is coupled to the mobile network communication module and the SLIC module, decodes the text message to obtain a text content in the text message, transforms the text content into a speech content, and plays back the speech content through the SLIC module.

In an embodiment of the invention, the SLIC module generates and turns on a ringing in response to the speech content received from the processor.

In an embodiment of the invention, the processor determines a severity of the text message, and the SLIC module sets up a frequency or a pattern of the ringing according to the severity.

In an embodiment of the invention, the SLIC module plays back the speech content in response to an off-hook state detected at the traditional telephone set.

In an embodiment of the invention, the SLIC module ends the operation of playing back the speech content in response to an on-hook state detected at the traditional telephone set.

The message transmission method of the invention is adapted to a device supporting a cellular network and a public switched telephone network, and includes the following steps. A text message is received from the cellular network. The text message is decoded to obtain a text content in the text message. The text content is transformed into a speech content. The speech content is played back through the PSTN.

In an embodiment of the invention, the step of playing back the speech content through the PSTN includes the following steps. A ringing is generated and turned on through a subscriber line interface circuit (SLIC) in response to the speech content being generated.

In an embodiment of the invention, the step of generating the ringing through the SLIC includes the following steps. The severity of the text message is determined. A set of frequency or a pattern of the ringing is set up according to the severity.

In an embodiment of the invention, the step of playing back the speech content through the PSTN includes the following steps. The speech content is played back in response to an off-hook state being detected.

In an embodiment of the invention, after the step of playing back the speech content through the PSTN, the following steps are further included. The operation of playing back the speech content is ended in response to an on-hook state being detected.

Based on the above, according to the embodiments of the invention, by transforming the text message from the cellular network into the speech content and transmitting the speech content to the traditional telephone set through the SLIC, the integration problem for transmitting text message to the plain old telephone service (POTS) networking system may be solved. In addition, by providing different ringing manners described in the embodiments of the invention, the user is able to understand the severity of the text message (emergency, importance, etc.).

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
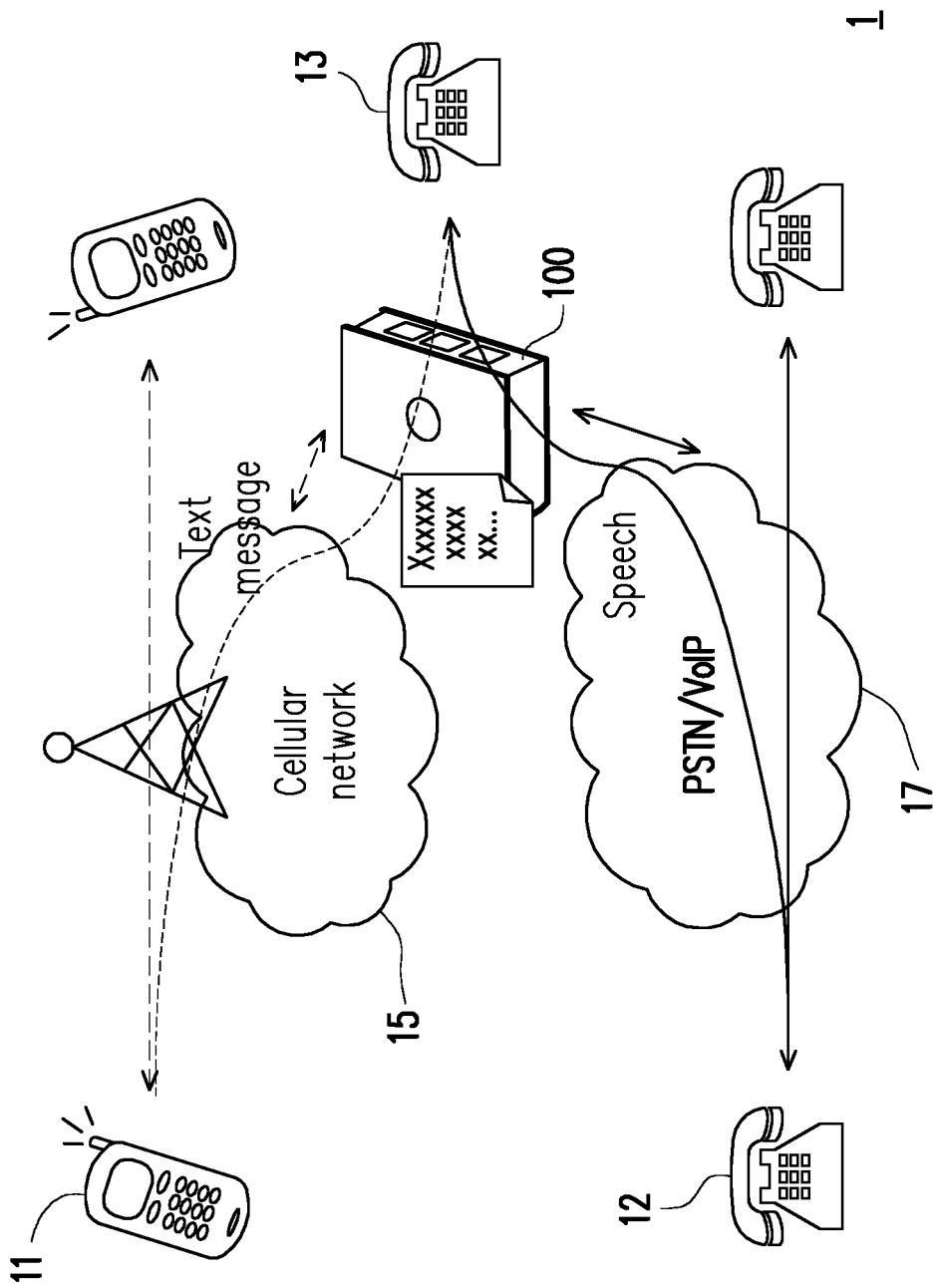
FIG. 1 is a schematic diagram of a communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a communication system 1 according to an embodiment of the invention. With reference to FIG. 1, the communication system 1 includes but not limited to a mobile terminal 11, traditional telephone set 12 and 13 and a text message transmission apparatus 100.

The mobile terminal 11 may be a cell phone, a tablet computer or the like for receiving services provided by a cellular (mobile) network 15, and the mobile terminal 11 may also send a text message (e.g., Short Message Service (SMS)) or make a phone call through the cellular network 15.

It should be noted that, in some embodiments, the text message (e.g., Cell Broadcast Service (CBS)) may also be originated from a broadcasting platform of government, businesses or companies and sent through a cell broadcast center of a telecommunications service provider.

The traditional telephone sets 12 and 13 may be telephones supporting a public switched telephone network (PSTN) or a voice over IP (VoIP) 17, and the traditional telephone sets 12 and 13 may establish voice calls via the PSTN or the Internet.

Figure 2:
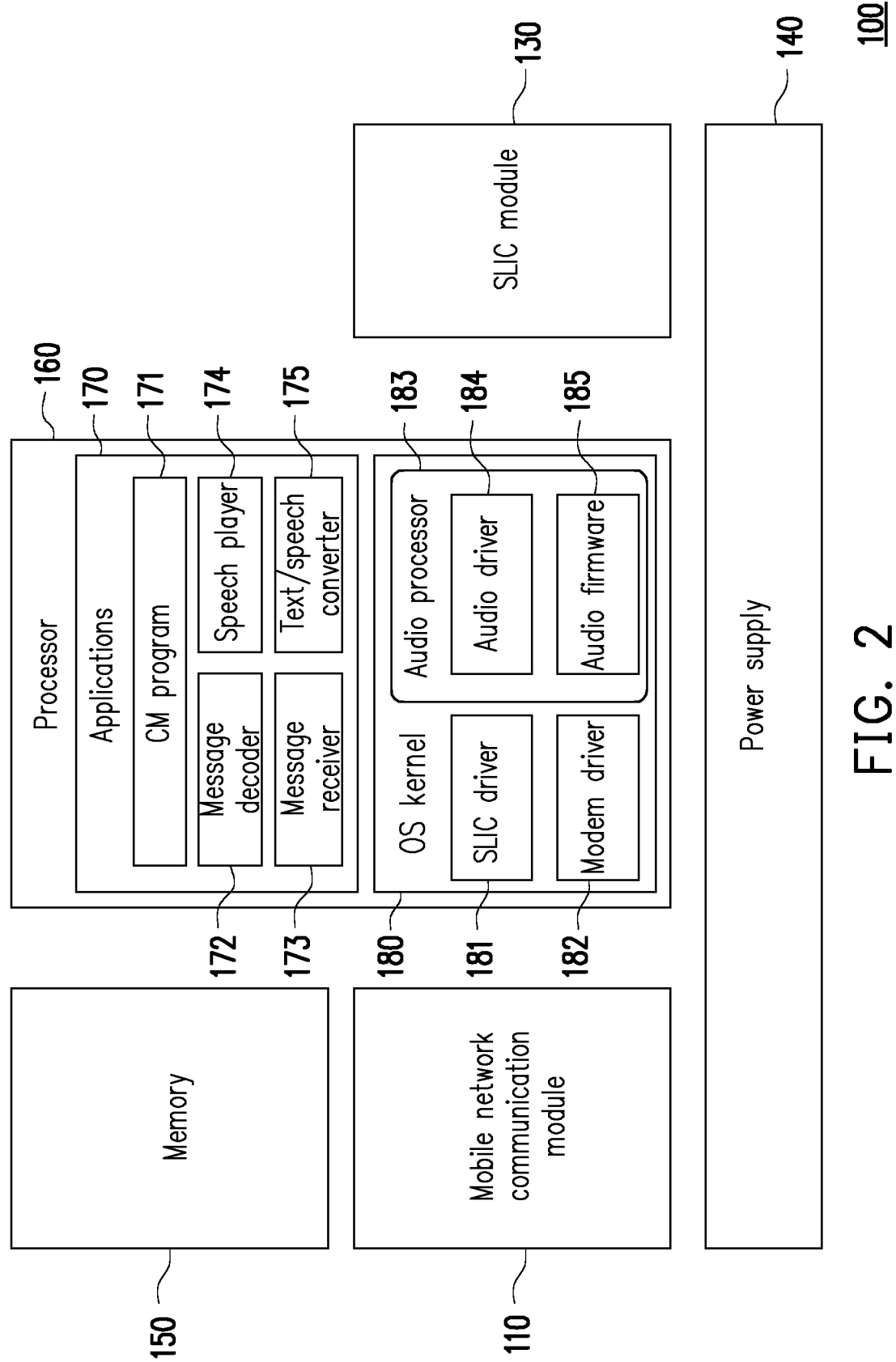
FIG. 2 is a device block diagram of a text message transmission apparatus according to an embodiment of the invention.

With reference to FIG. 2, the text message transmission apparatus 100 includes but not limited to a mobile network communication module 110, a subscriber line interface circuit (SLIC) module 130, a power supply 140, a memory 150 and a processor 160.

Figure 3:
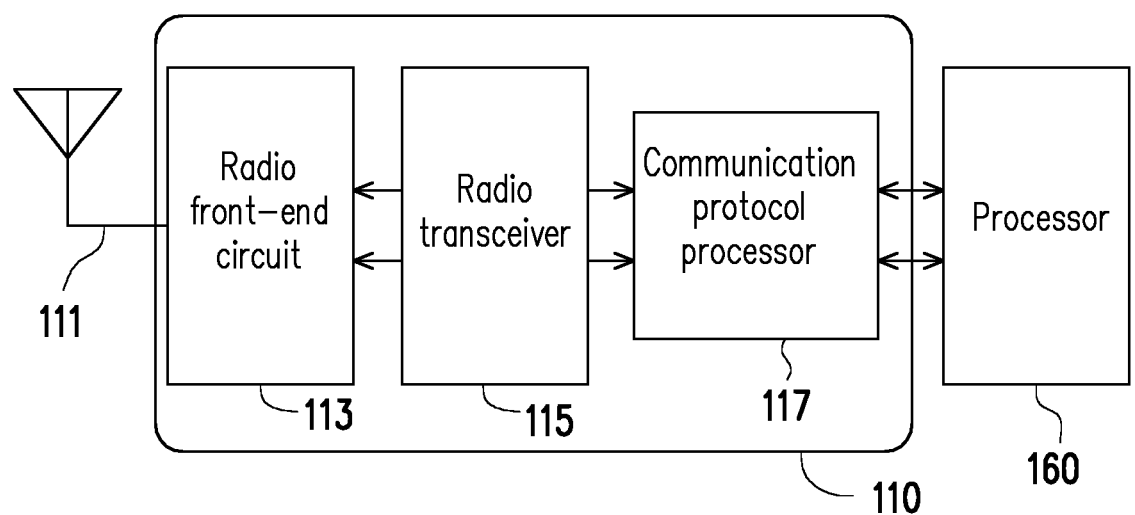
FIG. 3 is a device block diagram of a mobile network communication module and a processor according to an embodiment of the invention.

With reference to FIG. 3, the mobile network communication module 110 includes but not limited to at least one antenna 11, a radio front-end circuit 113, a radio transceiver 115 and a communication protocol processor 117. The radio front-end circuit 113 is configured to convert a radio frequency output by the antenna 111 into an analog baseband signal. The radio transceiver 115 executes processing operations such as low noise amplifying, impedance matching, frequency mixing, frequency up-conversion or down-conversion, filtering, amplification, analog and digital signal conversion and the like. The communication protocol processor 117 is configured to execute protocol layer function entities of a terminal device, such as a radio resource control (RRC), a mobile management (MM) in second-generation, third-generation, or fourth-generation mobile communication standards, and the communication protocol processor 117 is connected to the processor 160 to transmit data to each other.

Figure 4:
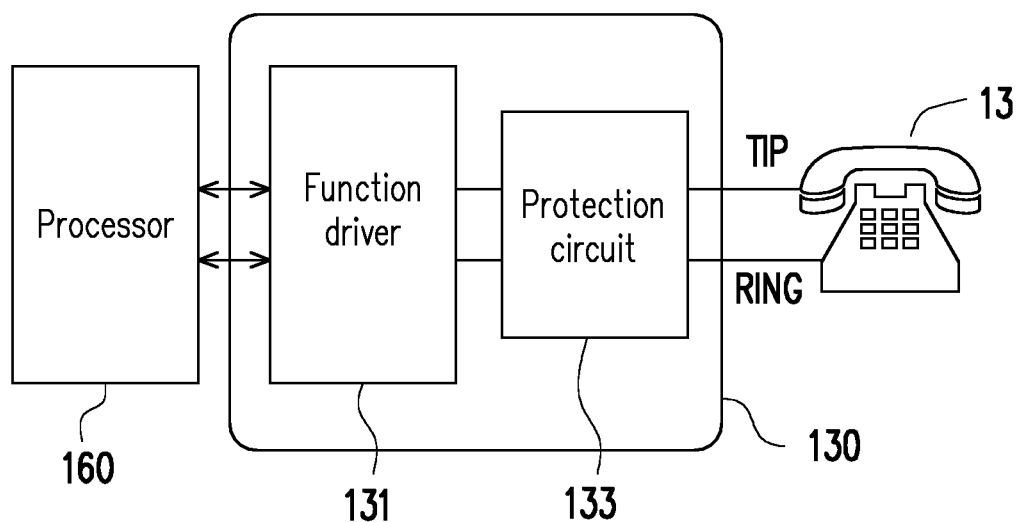
FIG. 4 is a device block diagram of a SLIC module, a traditional telephone set and a processor according to an embodiment of the invention.

With reference to FIG. 4, the SLIC module 130 is coupled to the processor 160, and the SLIC module 130 includes a function driver 131 and a protection circuit 133. The function driver 131 is configured to execute related functions in the SLIC, including a codec, a ringing generation, a local and incoming sound sources separation, a detection on an on-hook state and an off-hook state of the traditional telephone set 13, an adjustment on the ringing and wiring-related functions. The protection circuit 133 includes electronic elements that protect the SLIC from current and voltage, such as a fuse, a gas discharge tube, and a thyristor.

The SLIC module 130 further provides a telephone line (e.g., TIP, RING) interface for connecting with the traditional telephone set 13 so as to accordingly generate and turn on the ringing on the traditional telephone set 13 and play back a speech content.

The power supply 140 includes a mains power port or power supplying devices including a battery, a power converter, a transformer, which are used to provide power required by the text message transmission apparatus 100.

The memory 150 may be a fixed or a removable device in any possible forms, including a random access memory (RAM), a read-only memory (ROM), a flash memory or other similar devices or a combination of the above-mentioned devices. The memory 150 is configured to store a text message, a text content, a speech content, a programming code, a device configuration, a codebook, buffer or permanent data, a codebook and the like.

The processor 160 is configured to process a digital signal and execute procedures according to the exemplary embodiments of the invention, and is able to access or load in data or software modules recorded in the memory 150. Functions of the processor 160 may be implemented by using a programmable unit, such as a central processing unit (CPU), a microprocessor, a micro controller, a digital signal processing (DSP) chip, a field programmable gate array (FPGA). Functions of the processor 160 may also be implemented by an independent electronic device or integrated circuit (IC), and operations the processor 160 may be implemented in form of hardware. In this embodiment, the processor 160 runs applications 170 (e.g., software programs or modules, including a connection manager (CM) program 171, a message decoder 172, a message receiver 173, a speech player 174, a text/speech converter 175, an operating system (OS) kernel 180, a SLIC driver 181, a modem driver 182, and an audio processing driver 184 and an audio firmware 185 in an audio processor 183), and their operative functions will be described in more details in the following embodiments.

For better understanding of operating procedures in the embodiments of the invention, various embodiments are provided below and served to further describe the operating procedures of the text message transmission apparatus 100 in the embodiments of the invention.

Figure 5:
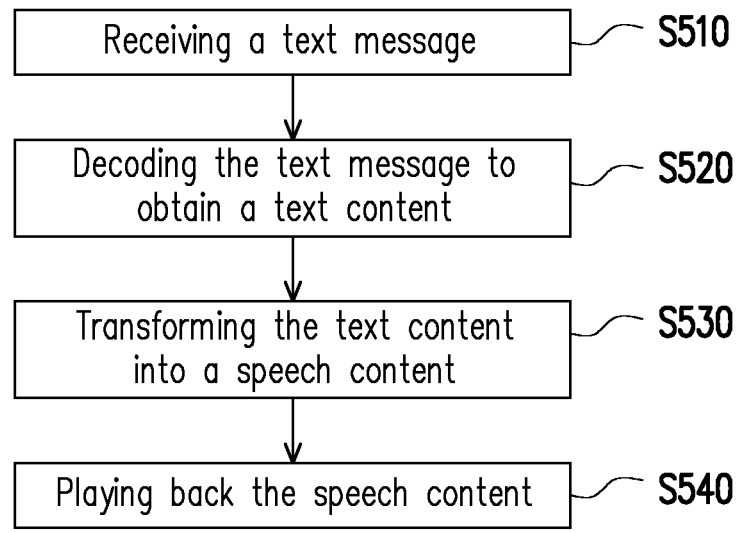
FIG. 5 is a flowchart of a text message transmission method according to an embodiment of the invention.

FIG. 5 is a flowchart illustrating a message transmission method according to an embodiment of the invention. With reference to FIG. 5, the method of this embodiment is adapted to the text message transmission apparatus 100 supporting the cellular network 15 and the PSTN/VoIP 17 in the communication system 1 in FIG. 1. In the following paragraphs, the method according to the embodiments of the invention is described below with reference various elements and modules in the text message transmission apparatus 100. Various steps of the method can be adjusted according to an actual implementation requirement, which is not limited by the present disclosure.

After the power supply 140 is activated, the processor 160 loads in related hardware drivers in the applications 170 (e.g., the SLIC driver 181 for driving the SLIC module 130, the modem driver 182 for driving the mobile network communication module 110) and other computing program codes. Next, the processor 160 runs the CM program 171 to drive the mobile network communication module 110 to search for available cellular network resources in the cellular network 15 and monitor an access state to the cellular network 15 for the mobile network communication module 110. After camping on the cellular network, the CM program 171 may drive the message receiver 173 to receive the text message from the cellular network 15.

When CM program 171 receives the text message (e.g., messages like SMS or CBS) from the cellular network 15 through the mobile network communication module 110 (step S510), the CM program 171 transmits the text message to the message decoder 172 so the message decoder 172 can decode the text message to obtain the text content (step S520). The message decoder 172 decodes the text message into the text content (including information like content in a payload, or even an encoding method, a sender number, etc.) based on, for example, Third Generation Partnership (3GPP) TS 23.038 standard. Then, the message decoder 172 returns a decoding result to the CM program 171. The CM program 171 transmits the decoded text content to the text/speech converter 175.

The text/speech converter 175 then drives the audio processor 183 to execute a speech generating procedure and transforms the text content into the speech content according to a text to speech (TTS) technology (step S530). Next, the CM program 171 drives the SLIC module 130. When receiving the speech content from the CM program 171, the SLIC module 130 generates a ringing on the traditional telephone set 13.

Figure 6:
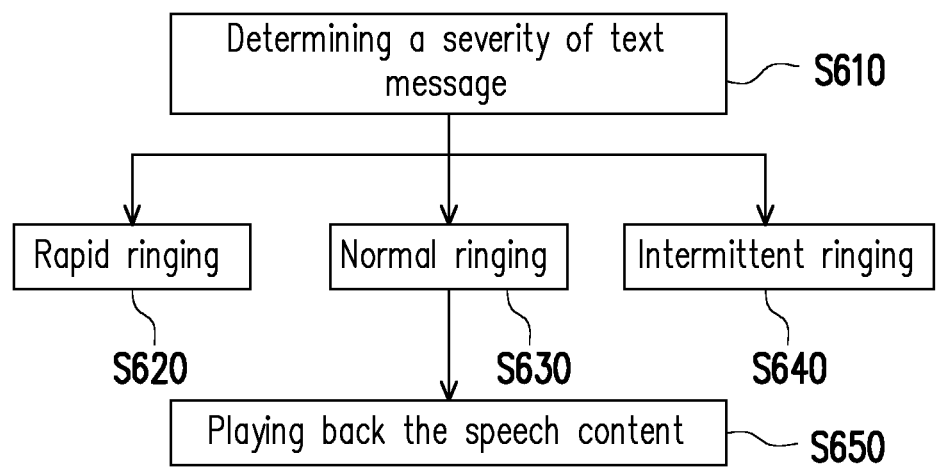
FIG. 6 is a flowchart related to a severity of the message according to an embodiment of the invention.

It should be noted that, the text message may have varying degrees of severity or importance. With reference to FIG. 6, in an embodiment, the CM program 171 may determine a severity of the text message from the decoded text content (step S610) so that the SLIC module 140 may then set up a frequency or a pattern of the ringing according to the determined severity. For example, an emergency broadcast message has the highest severity, and thus the SLIC module 130 increases the frequency of the ringing so as to generate a rapid ringing sound (step S620). For general broadcast messages, the SLIC module 130 generates a normal ringing sound (step S630). For general text messages, the SLIC module 130 changes the pattern of the ringing so as to generate an intermittent ringing sound (step S640). It should be noted that, the classification of the severity of the text message and the change of frequency or the pattern of the corresponding ringing may also be varied, and the user can make changes based on demands other than being limited by the embodiment of FIG. 6.

Next, when the SLIC module 130 detects that the traditional telephone set 13 is in the off-hook state (e.g., when a handset is picked up or an answer button is pressed), the SLIC module 140 plays back the speech content (step S650) so as to play back the speech content on the traditional telephone set 13 (step S540). When the SLIC module 130 detects that the traditional telephone set 13 is in the on-hook state (e.g., when the handset is put back to the telephone or a hang up button is pressed), the SLIC module 130 ends the operation of playing back the speech content. Meanwhile, the CM program 171 may keep the text/speech content in the memory 150 or directly delete the text/speech content, depending on settings or demands.

In summary, according to the embodiments of the invention, the text message from the cellular network may be transformed into the speech content for transmission to the PSTN so that the traditional telephone set is able to receive the speech content and the user may listen to the text content of the text message in voice. As a result, simply by connecting the traditional telephone set to the text message transmission apparatus, the user is able to receive (emergency, disaster, etc) warning messages.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A text message transmission apparatus, comprising:
a mobile network communication transceiver, connecting to a cellular network and directly receiving a text message from the cellular network;
a subscriber line interface circuit (SLIC), directly connecting to a traditional telephone set in a public switched telephone network (PSTN); and
a processor, coupled to the mobile network communication transceiver and the SLIC, the processor decoding the text message to obtain a text content in the text message, determining a severity of the text message according to the text content, transforming the text content into a speech content, and playing back the speech content directly to the traditional telephone set through the SLIC, wherein the SLIC sets up a frequency or a pattern of a ringing directly to the traditional telephone set according to the severity, and the severity corresponding to an emergency broadcast message has a different frequency or a different pattern of the ringing in comparing with a general text message.

2. The text message transmission apparatus of claim 1, wherein
the SLIC generates the ringing in response to the speech content received from the processor.

3. The text message transmission apparatus of claim 1, wherein
the SLIC plays back the speech content in response to an off-hook state detected at the traditional telephone set.

4. The text message transmission apparatus of claim 1, wherein
the SLIC ends the operation of playing back the speech content in response to an on-hook state detected at the traditional telephone set.

5. A message transmission method, adapted to a device supporting a cellular network and a public switched telephone network, the message transmission method comprising:
connecting to the cellular network and directly receiving a text message from the cellular network;
decoding the text message to obtain a text content in the text message;
determining a severity of the text message according to the text content;
transforming the text content into a speech content;
setting up a frequency or a pattern of a ringing directly to a traditional telephone set according to the severity through a subscriber line interface circuit (SLIC), wherein the severity corresponding to an emergency broadcast message has a different frequency or a different pattern of the ringing in comparing with a general text message; and
playing back the speech content directly to the traditional telephone set in the public switched telephone network through the SLIC.

6. The message transmission method of claim 5, wherein the step of playing back the speech content through the public switched telephone network comprises:
generating the ringing through the SLIC in response to the speech content being generated.

7. The message transmission method of claim 5, wherein the step of playing back the speech content through the public switched telephone network comprises:
   playing back the speech content in response to an off-hook state being detected.

8. The message transmission method of claim 5, wherein after playing back the speech content through the public switched telephone network, the message transmission method further comprises:
   ending the operation of playing back the speech content in response to an on-hook state being detected.

* * * * *